United States Patent Office 3,297,768
Patented Jan. 10, 1967

3,297,768
SEPARATION OF MIXTURES WHICH CONTAIN A NON-VOLATILE COMPLEX CATALYST
Hubert Kindler, Ludwigshafen (Rhine), and Hans Georg Trieschmann, Hambach, Pfalz, Germany, assignors to Badische Anilin- & Soda-Fabrik Aktiengesellschaft, Ludwigshafen (Rhine), Germany
No Drawing. Filed Apr. 13, 1965, Ser. No. 447,918
Claims priority, application Germany, Feb. 18, 1959, B 52,153
3 Claims. (Cl. 260—632)

This is a continuation-in-part of our application Serial No. 8,899, filed February 16, 1960, now abandoned. It relates to a process for the separation of mixtures which contain a non-volatile complex catalyst. More particularly, it relates to a process for the separation of mixtures which contain a non-volatile complex iron-containing catalyst, the iron being removed from the mixture in the form of iron pentacarbonyl.

It is known that alcohols can be prepared from olefins by reacting them with carbon monoxide and water at elevated temperatures in the presence of a complex catalyst obtainable from an iron carbonyl, an amine and water. Thus propanol is obtained from ethylene and butanol from propylene. If a part of the water is replaced by ammonia or a primary or secondary amine, then amines are obtained which have at least one alkyl substituent containing one carbon atom more than the initial olefin. Thus for example mainly tributylamine is obtained in this way from propylene, carbon monoxide, water and ammonia, and a mixture of mono- and di-propylaniline is obtained from ethylene, carbon monoxide, water and aniline.

An advantageous procedure applied in the continuous conversion of olefins to alcohols, for example of propylene to butanol, comprises leading the gaseous olefin and the carbon monoxide under increased pressure and at elevated temperature into a mixture containing the catalyst. The unreacted gaseous initial materials leave the reaction chamber together with carbon dioxide and hydrogen which forms inter alia in the formation of the catalyst from iron carbonyl, amine and water. The alcohol formed and other entrained volatile but condensable constituents are separated from the gas current. After removal of carbon dioxide and hydrogen, the olefin and carbon monoxide are returned to the process. By side reactions there are continuously formed small amounts of undesirable by-products, such as $C_5$ alcohols and $C_4$ and $C_5$ carboxylic acids, which gradually become enriched in the reaction mixture. When the content of these substances and of introduced extraneous susbtances, as for example lubricating oil, has reached about 3 to 15% by weight, especially 5 to 10% by weight, it is preferable to interrupt the process so that they may be removed. The distillative separation of the mixture, which may contain, besides the catalyst and the reaction product, inter alia also water, iron carbonyl, the amine used and possibly other bases, valeric acid, formic acid and lubricating oil, offers great difficulty because the complex catalyst is very sensitive to heat and decomposes in a distillation at atmospheric pressure and even under reduced pressure, thereby giving rise to the formation of considerable amounts of viscous black grease. This occasions on the one hand undesirable expenditure for the cleaning of the apparatus and on the other hand great waste of catalyst and other valuable substances, such as butanol.

It is an object of this invention to provide a process by which the said mixtures and corresponding mixtures obtained in the production of other alcohols in an analogous manner may be worked up so that no loss or only trivial loss of catalyst and other valuable substances takes place.

A more specific object of the invention is an advantageous method for recovering, from a reaction mixture, complex catalysts prepared from iron carbonyls. Another object of this invention is to provide a process in which the expenditure for cleaning the apparatus is small.

According to the present invention, the said objects are achieved by treating a mixture which contains an iron-containing non-volatile complex catalyst and undesirable by-products at elevated temperature and advantageously under increased pressure with a stream of carbon monoxide or with a gas stream containing carbon monoxide. The treatment usually comprises passing the gas stream through the mixture. Surprisingly the complex catalyst is broken down by the carbon monoxide treatment, iron pentacarbonyl being formed and carried away in the gas stream. From the gas stream there are then separated the entrained condensable substances including iron pentacarbonyl, and the iron pentacarbonyl, if desired, is separated from the other entrained condensable substances. The gas stream is preferably led back into the mixture and the residue rectified after removal of the bulk of the iron as iron carbonyl and possibly after treatment with a base.

The mixtures which are treated by the new method are obtained in the conventional production of alcohols from olefins, carbon monoxide and water, or of amines from olefins and ammonia or primary or secondary amines and water. The catalysts which are used in the new method and are therefore dissolved in the mixtures to be treated, are formed from
 (a) Iron tetracarbonyl or preferably iron pentacarbonyl,
 (b) Water, and
 (c) An amine. Amines having up to 18, particularly up to 9, carbon atoms are preferred. Apart from the amino nitrogen atom, they have the structure of saturated hydrocarbons or contain, in addition, 1 to 3 hydroxyl groups. Examples of suitable amines are trimethylamine, N-butyl diethanolamine, pyrrolidine, piperidine, N-butylpyrrolidine, N-butlylpiperidine, N-methylpyrrolidine and N-butyl-3-hydroxypyrrolidine.

The complex catalysts may be obtained by mixing the components in any sequence. The complex catalysts are stable compounds which may be isolated as such in solid form. Thus, for example, a complex having the formula

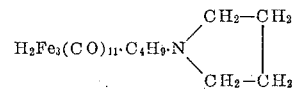

may be obtained from iron pentacarbonyl, N-butylpyrrolidine and water in the form of a graphite-like non-volatile substance. Likewise, complexes that are obtained in the way described by adding a nitrile, isonitrile or lactam and which are also suitable catalysts, are stable compounds. However, in the process according to this invention they are decomposed into their components and may thus be recovered.

The mixtures usually contain 20 to 30% by weight of iron, calculated as iron pentacarbonyl. They also contain undesirable by-products, such as carboxylic acids, higher alcohols and lubricating oil, in amounts which may, in the course of a reaction time of several weeks, increase to 15% by weight. In general it is advisable to process the mixtures by the method according to this invention when the content of undesirable by-products has reached 5 to 10% by weight.

By the treatment of the mixture with carbon monoxide, the iron content, calculated as iron pentacarbonyl, can be decreased from the original about 20 to 30% by weight without difficulty to 2 to 6% by weight and in favorable conditions to 2 to 3% by weight. When this state has been reached it is considered here and in the following description that the bulk of the iron has been removed.

It should be pointed out however that these figures are not critical. Any attempts to further decrease the iron content involve expenditure which bears no proportion to the additional benefit thus achieved. Nevertheless, treatment of the mixtures, prior to distillation, with carbon monoxide until the iron content is e.g. 10% by weight, constitutes an advance on the method of processing the mixtures without previous carbon monoxide treatment. Although the results are not so good as those achieved by lowering the iron content to 2 to 6% by weight by carbon monoxide treatment prior to distillation, they are better than those obtained without carbon monoxide treatment.

According to the new process it is possible to recover the greater part of the valuable substances contained in the said mixtures. When the bulk of the iron pentacarbonyl has been removed, the separation of the residue by distillation no longer offers any difficulty.

The stream of carbon monoxide may consist of pure carbon monoxide, but it is also possible to use mixtures which contain, in addition to carbon monoxide, at least one gas which is inert under the conditions of the process, such as hydrogen and nitrogen. Suitable gases include generator gas, producer gas and watergas, the carbon monoxide content of said mixtures preferably exceeding 40% by weight. The higher the content of carbon monoxide in the gas, the more quickly does the splitting up of the complex catalyst take place. Processing may be carried out immediately after the alcohol synthesis by stopping the flow of olefin and feeding only carbon monoxide into the reactor as soon as the content of undesirable by-products reaches a preselected point between 3 and 15% by weight.

The temperatures most favorable for the splitting up of the catalyst lie between about 70° and 130° C., especially between 90° and 130° C. In most cases the process is carried out between 90° and 110° C.

The process may be carried out at atmospheric pressure but it is advantageous to use pressures between 3 and 40 atmospheres, especially between 8 and 40 atmospheres. In most cases the process is carried out at a pressure between 8 and 15 atmospheres. It is advantageous for the pressure and the carbon monoxide content in the gas stream to be correlated so that the partial pressure of the carbon monoxide is at least 3 atmospheres, preferably 5 to 15 atmospheres.

The iron pentacarbonyl and the other readily volatile constituents entrained from the mixture in the treatment chamber by the gas stream are separated from the gas stream, preferably by cooling under operational pressure, by spraying, for example with water, or by absorption in a solvent. The mixture of the separated substances may be used directly for the preparation of fresh catalyst.

In the separation by condensation, the iron carbonyl as a rule separates as a specific phase of higher density from the other condensed substances. The iron carbonyl can therefore also be recovered as such by separating it from the other constituents of the condensate poor in or free from carbonyl and returning these to the mixture in the treatment chamber.

However, the vapor-laden gas stream may be led immediately after leaving the treatment chamber and under the pressure prevailing therein upwardly through a suitable distillation column. In the case of the synthesis of butanol, there is obtained at the top of the column a three-layered mixture of which the lowermost layer consists mainly of iron pentacarbonyl, the middle layer of water and the uppermost layer of butanol. The iron carbonyl layer is withdrawn and the two layers are added at least in part as reflux liquid to the top of the distillation column in which they retain the amine, as a rule N-butylpyrrolidine. Together with the N-butylpyrrolidine they are then returned from the bottom of the column to the reaction chamber. The gas stream freed from the entrained constituents of the mixture is preferably led back into the mixture to be separated. A part of the upper layer which mainly consists of butanol may also be withdrawn and the small proportion of iron pentacarbonyl still contained therein removed, advantageously by means of a gas stream which is led in countercurrent to the butanol which is trickling down in a packed column.

Since, during the synthesis of butanol, there are always formed certain amounts of formic acid which, similarly to the $C_4$ and $C_5$ carboxylic acids also formed, give rise to the formation of the corresponding butyl esters in the distillation, it is recommendable to treat the mixture which has been substantially freed from catalyst, with an aqueous base, as for example with caustic soda solution, prior to the distillation. The acids thereby pass as sodium salts into the aqueous layer and are separated therewith. If the distillate is to be used directly for charging the reaction chamber for a fresh batch, it is not necessary to remove the formic acid because in this case the formic acid esters do not cause any disturbance but are split up again into acid and butanol.

The following examples will further illustrate this invention but the invention is not restricted to these examples.

*Example 1*

The synthesis of butanol from propylene, carbon monoxide and water is carried out in a pressure vessel of 10 cubic meters capacity. There are charged into the vessel, prior to the commencement of the synthesis, 2000 kilograms of butanol and, for preparation of the catalyst, 2500 kilograms of iron pentacarbonyl, 2000 kilograms of N-butylpyrrolidine and 1600 kilograms of water. Into the mixture heated to 100° C. there are led propylene and carbon monoxide in the molar ratio of 1:3 under a pressure of 10 atmospheres gage. The readily volatile substances entrained by the gas stream are deposited by cooling under the operational pressure, separated from each other by countercurrent exchange in a rectification column and withdrawn or returned to the pressure vessel. The bulk of the carbon dioxide and hydrogen are then removed from the gas stream and the gas stream is returned to the pressure vessel. The substances used up by the reaction are continually replaced. 5000 cubic meters of gas (S.T.P.) are circulated per hour in all.

As soon as the undesirable constituents (which include $C_5$ alcohols and $C_5$ carboxylic acids, tributylamine and lubricating oil) have reached a content of about 10% in the reaction solution, the supply of propylene is shut off. The pressure of 10 atmospheres gage is then maintained exclusively by the supply of carbon monoxide. The total amount of gas circulated continues to be 5000 cubic meters per hour (S.T.P.). Since the residual propylene is quickly reacted and carbon dioxide and hydrogen are gradually removed from the circulating gas, the gas phase consists after some time practically completely of carbon monoxide, so that the catalyst complex is rapidly split up. The amount of freshly supplied carbon monoxide becomes less at the rate at which the residual propylene is used up and the amount of complex catalyst in the mixture decreases. The entrained readily volatile constituents are separated from the gas stream by cooling with water under the operating pressure of 10 atmospheres. A separation of these substances is achieved by leading the laden gas stream into the bottom of a column so that the ascending gas and the downwardly trickling liquid phase which consists of butanol and water are intimately mixed and an exchange of substances takes place between them. There is then obtained at the bottom of the column N-butylpyrrolidine and a part of the normal butanol, while iron pentacarbonyl, water and the remainder of the butanol pass over the top and form three layers, the bottom layer consisting of iron pentacarbonyl, the middle layer of water and the top layer of normal butanol. The iron carbonyl is withdrawn. 85% of the iron which was present in the mixture to be split up are thus obtained after some time in the form of iron pentacarbonyl. At the beginning, 150 kilograms of butanol are withdrawn per hour. This amount is later reduced and after 6 hours is only 50 kilograms per hour. The remainder of the butanol and all of the water are returned to the top of the column. The N-butylpyrrolidine and the normal butanol not withdrawn from the top are returned from the sump to the pressure vessel.

The butanol withdrawn at the top of the column is led in a second column at 60° to 100° C. in countercurrent to the carbon monoxide which serves to maintain a pressure of 10 atmospheres in the gas circulation. It is thus freed from small amounts of iron carbonyl.

After the mixture present in the pressure vessel has been treated in the said manner for about 6 hours, its content of iron compounds, calculated as iron pentacarbonyl, has fallen 2 to 3% by weight. The mixture is washed with about 1000 kilograms of concentrated soda solution and the individual constituents are separated by discontinuous fractional distillation.

From the gas stream and by distillation of the residue remaining in the pressure vessel 98% of the butanol and N-butylpyrrolidine, which were present in the pressure vessel when the supply of propylene was discontinued, are recovered.

If on the other hand and for purposes of comparison 1 kilogram of the mixture from the pressure vessel is distilled under atmospheric pressure without pretreatment with carbon monoxide, only 25 grams of iron pentacarbonyl are recovered together with 175 grams N-butylpyrrolidine which contain a further 15 grams of iron pentacarbonyl dissolved therein. There remains a viscous black grease which contains 65 grams of iron, corresponding to 230 grams of iron pentacarbonyl. Only 15% of the recoverable iron pentacarbonyl and 80% of the base are obtained. When carrying out the process on an industrial scale, the results are still more unfavorable by reason of the longer residence periods. By distillation under reduced pressure, these results can only be improved inconsiderably.

*Example 2*

The synthesis of butanol is carried out with a catalyst which has been prepared from 2500 kilograms of iron pentacarbonyl, 2000 kilograms of N-butylpyrrolidine, 700 kilograms of adiponitrile and 1600 kilograms of water. The reaction temperature is 105° C. and the pressure 15 atmospheres gage.

When the content of undesirable constituents in the mixture amounts to about 10%, the supply of propylene is shut off and the mixture treated in the way described in Example 1 with carbon monoxide. From the escaping gas stream there are obtained 76% of the iron which was present in the reaction mixture at the end of the supply of propylene, in the form of iron pentacarbonyl. The mixture remaining in the pressure vessel is fractionally distilled without previous treatment with caustic soda solution. 98% of the butanol and of the N-butylpyrrolidine which were present in the pressure vessel at the end of the propylene supply are recovered. The butanol occurs partly in the form of its ester with formic acid and with $C_4$ and $C_5$ carboxylic acids. The bulk of the adiponitrile used is also recovered from the residue by distillation under reduced pressure.

*Example 3*

The synthesis of butanol is carried out under the conditions described in Example 1, but 400 kilograms of thiodiglycol are additionally used in the preparation of the catalyst.

When the content of undesirable constituents in the reaction mixture has risen to about 12% by weight, the supply of propylene is discontinued and the mixture treated in the way described in Example 1 with producer gas. 81% of the iron which was present in the reaction mixture when the propylene supply was shut off are recovered in the form of iron pentacarbonyl. After washing with alkali, carried out as described in Example 1, there are obtained, by fractional distillation of the mixture remaining in the pressure vessel, 98% of the butanol and 95% of the N-butylpyrrolidine. The bulk of the thiodiglycol can also be recovered from the residue by distillation under reduced pressure.

The examples show very clearly that the present invention provides an especially advantageous method for recovering complex catalysts prepared from iron carbonyl from a reaction mixture. By reaction mixture there is to be understood above all a sump phase such as arises in the synthesis of alcohols from an olefin, water, a complex catalyst or in synthesis of amines from an olefin, water, a complex catalyst and ammonia or an amine, which sump phase has become enriched in by-products during prolonged operation.

We claim:
1. In a process for the production of alcohols wherein an olefin and carbon monoxide are passed into a reaction mixture containing water and containing a non-volatile complex catalyst formed by mixing an iron carbonyl, water, and an amine, in which process undesirable by-products are continuously formed, the improvement which comprises: stopping the flow of olefin into the reaction mixture as soon as the level of said undesirable by-products reaches a point between about 3 and 15% by weight, conducting a stream of carbon monoxide through said reaction mixture at a temperature of between 70° and 130° C. and at a pressure between atmospheric pressure and 40 atmospheres, whereby said complex catalyst is decomposed into iron carbonyl and an amine and whereby said iron carbonyl is carried out of said reaction mixture along with said carbon monoxide gas; and condensing iron carbonyl from the effluent gas.

2. In a process for the production of alcohols wherein an olefin and carbon monoxide are passed into a reaction mixture containing water and containing a non-volatile complex catalyst formed by mixing an iron carbonyl, water, and an amine, in which process undesirable by-products are continuously formed, the improvement which comprises: stopping the flow of olefin into the reaction mixture as soon as the level of said undesirable by-products reaches a point between 3 and 15% by weight, conducting a stream of carbon monoxide through said reaction mixture at a temperature of between 90° and 130° C. and at a pressure between 8 and 40 atmospheres, whereby said complex catalyst is decomposed into iron carbonyl and an amine and whereby said iron carbonyl is carried out of said reaction mixture along with said carbon monoxide gas; and condensing iron carbonyl from the effluent gas.

3. In a process for the production of alcohols wherein an olefin and carbon monoxide are passed into a reaction mixture containing water and containing a non-volatile complex catalyst formed by mixing iron carbonyl, water, and an amine, in which process undesirable by-products are continuously formed, the improvement which comprises: stopping the flow of olefin into the reaction mixture as soon as the level of said undesirable by-products reaches a point between about 3 and 15% by weight, conducting a stream of carbon monoxide through said reaction mixture at a temperature of between 90° and 110° C. and at a pressure between 8 and 15 atmospheres, whereby said complex catalyst is decomposed into iron carbonyl and an amine and whereby said iron carbonyl is carried out of said reaction mixture along with said carbon monoxide gas, the passage of said carbon monoxide without said olefin through said reaction mixture being carried out until the iron pentacarbonyl content of said reaction mixture is lowered to about 2 to 6% by weight; and condensing iron carbonyl from the effluent gas.

No references cited.

CHARLES B. PARKER, *Primary Examiner.*

R. L. RAYMOND, *Assistant Examiner.*